United States Patent [19]

Vernier

[11] Patent Number: 5,261,369
[45] Date of Patent: Nov. 16, 1993

[54] PROCESS AND DEVICE FOR DETERMINING OPERATING CHARACTERISTICS OF A COMBUSTION ENGINE WITH INDEPENDENTLY FED CYLINDERS

[75] Inventor: Yannick Vernier, Massy, France

[73] Assignee: Souriau Diagnostic Electronique S.A., Paray-Vieille-Poste, France

[21] Appl. No.: 749,532

[22] Filed: Aug. 26, 1991

[30] Foreign Application Priority Data

Aug. 29, 1990 [FR] France ................. 90 10781

[51] Int. Cl.⁵ ................. F02D 41/00; G01M 15/00
[52] U.S. Cl. ................. 123/336; 123/488; 123/494; 73/115
[58] Field of Search ........... 123/336, 341, 389, 587, 123/494, 488; 73/115

[56] References Cited

U.S. PATENT DOCUMENTS

| | | | |
|---|---|---|---|
| 3,774,580 | 11/1973 | McGavic | 123/494 |
| 3,812,831 | 5/1974 | Scott, Jr. et al. | 123/407 |
| 4,109,518 | 8/1978 | Dooley et al. | 73/119 A |
| 4,325,260 | 4/1982 | Takahashi et al. | 73/115 |
| 4,424,709 | 1/1984 | Meier, Jr. et al. | 73/115 |
| 4,483,183 | 11/1984 | Suzuki et al. | 73/116 |
| 4,574,265 | 3/1986 | Kaiser et al. | 123/494 |
| 4,582,033 | 4/1986 | Sorg et al. | 123/494 |
| 4,825,833 | 5/1989 | Ikeura et al. | 123/336 |
| 5,092,301 | 3/1992 | Ostdiek | 123/494 |

FOREIGN PATENT DOCUMENTS

| | | | |
|---|---|---|---|
| 59-5838 | 1/1984 | Japan | 123/478 |
| 1558209 | 12/1979 | United Kingdom. | |

*Primary Examiner*—Andrew M. Dolinar
*Attorney, Agent, or Firm*—Larson & Taylor

[57] ABSTRACT

The invention relates to a process and a device for determining operating characteristics of a cylinder (1) in a combustion engine in which each cylinder is provided with an intake duct (4) for the air/fuel mixture which is equipped with a member (5) for controlling the flow rate of the said mixture and which opens into the cylinder via an inlet port (6), a pressure sensor (11) being connected to the said intake duct between the control member and the port (6); the pressure sensor (11), which is independent of the components to be monitored, is used to detect in continuous fashion the pressure in the intake duct (4) between the control member (5) and the port (6); this pressure is converted in continuous fashion into an analog electrical signal representative of the pressure and of its variations; and this electrical signal is processed (in 12) in such a way as to obtain at least one desired operating characteristic of the cylinder.

22 Claims, 5 Drawing Sheets

PROCESS AND DEVICE FOR DETERMINING OPERATING CHARACTERISTICS OF A COMBUSTION ENGINE WITH INDEPENDENTLY FED CYLINDERS

The present invention relates to improvements made to the determination of operating characteristics of combustion engines and, more precisely, relates to a process and a device for determining operating characteristics of a cylinder in a combustion engine in which each cylinder is provided with an intake duct for the air/fuel mixture which is equipped with a means for controlling the flow rate of the said mixture and which opens into the cylinder via an inlet port, an external pressure sensor being connected to the said intake duct between the control member and the inlet port in the cylinder.

It is known to determine operating parameters (for example tachometric) of a combustion engine by tapping electric variables (ignition, sensor on the engine flywheel, etc.) However, the measurement devices constructed on this basis are dependent on the construction of the engine; furthermore, they are very sensitive to conducted and radiated electrical disturbances (presence of circuits under high voltage) and it proves difficult to obtain the useful signal in practice.

It is likewise known to use a pressure sensor connected to the intake pipe between the member for controlling the flow rate of the air/fuel mixture (throttle) and the inlet port in the cylinder. Having recourse to a pressure sensor does of course make it possible to avoid the problems posed by electrical disturbances in the abovementioned devices; however, these known devices with a pressure sensor are constructed in such a manner that they provide an indication corresponding only to the average value of the pressure prevailing in the intake pipe between the control member and the inlet port. But knowledge of the average value of the pressure only permits a limited number of information items to be obtained on the operation of the cylinder and more generally of the engine. Furthermore, it is not possible to carry out a tachometric recording on the basis of this average value.

The object of the invention is therefore essentially to propose a process and a device which remedy to the greatest extent possible the disadvantages of the processes and devices currently known and make it possible to acquire knowledge of a larger number of operating parameters of the cylinder and/or of the engine, and this moreover in continuous fashion during the operation of the engine, whatever the type of combustion engine (two-stroke, four-stroke, rotary) with independent feeding of each cylinder (in general high-speed engines, used in particular on motorcycles), with the further requirement that this process and this device should be simple to implement and, in particular, not require modifications or adjustments of the engines.

To achieve these ends, according to a first aspect of the invention, a process is proposed for determining operating characteristics of a cylinder of a combustion engine provided with an intake duct for the air/fuel mixture which is equipped with a member for controlling the flow rate of the said mixture and which opens into the cylinder via an inlet port, an external pressure sensor being connected to the said intake duct between the control member and the inlet port in the cylinder, the said process being defined essentially in that the pressure in the intake duct between the control member and the inlet port in the cylinder is detected in continuous fashion with the aid of the said pressure sensor, which is independent of the components to be monitored.

As a variant, a process is proposed for determining operating characteristics of a combustion engine in which each cylinder is provided with an intake duct for the air-fuel mixture which is equipped with a member for controlling the flow rate of the said mixture and which opens into the cylinder via an inlet port, an external pressure sensor being connected to the said intake duct between the control member and the inlet port in each cylinder, the said process being defined essentially in that the pressure in the intake duct between the control member and the inlet port of each corresponding cylinder is detected in continuous fashion with the aid of the said pressure sensors, which are independent of the components to be monitored.

Thus, by virtue of the process of the invention, the pressure sensor is no longer mechanically associated with the engine and it can also be arranged within the measuring device, it then being possible to establish a connection, as indicated below, with the aid of a flexible tube capable of transporting the pressure information between the pressure take-off (for example a readyprepared outlet provided as an original feature on the intake manifold of the cylinder) and the pressure sensor. The implementation of this process can thus be envisaged in the form of a device of simplified structure (all the components, including the pressure sensor are enclosed in the device) and easy to put into operation (a flexible tube to be connected to the intake manifold of the cylinder or of each cylinder).

Advantageously, the process of the invention can likewise be complemented if:
 the said pressure is continuously converted into an analog electrical signal representative of this pressure and of its variations, and
 this electrical signal is processed (in 12) in such a way as to obtain at least one desired characteristic of the operation of the cylinder.

Thus, by virtue of the means employed in conformity with the invention, the analog electrical signal available reflects the state of the instantaneous pressure in the intake pipe between the control member and the inlet port in the cylinder at each instant; above all, in highly advantageous fashion, the shape of the curve representing this electrical signal is likewise representative of the variation in the pressure and the individual points of this signal and/or of this curve can lead easily to the determination of operating characteristics of the cylinder and of the engine, more precisely and for a larger number of parameters than with previous processes and devices.

It is thus possible to compare the characteristics of all the cylinders of the engine.

It is likewise possible to continuously display the curve representing the development of this electrical signal over time, to compare the curve thus recorded with a reference curve and to deduce a diagnosis on the operation of the cylinder therefrom (for example the presence of a parasitic air inlet on the intake duct, malfunction of the valves, leakiness of the valves, etc.).

It is likewise possible to continuously display the curve representing the development of this electrical signal over time, to compare the curve recorded with the curves of the other cylinders and to deduce a diagnosis on the operation of the engine therefrom.

It is likewise possible to detect the instants at which the peaks (preferably the lower peaks, which are well defined whatever the type of engine) of the electrical signal occur, to measure the period of time separating two successive peaks and to deduce the speed of rotation of the engine therefrom.

It is likewise possible, in the case of a fourstroke engine, to detect the times at which the amplitude maxima of the electrical signal occur, the said maxima corresponding substantially to the passing of the top dead center position by the piston.

Advantageously, in order to use the process for the purpose of controlling the operating characteristics of an engine, a member for controlling the richness of each cylinder is acted upon until an ideal air/gasoline ratio for the operation of the engine and corresponding to its maximum speed is obtained.

According to a further variant of the invention, a process is proposed for controlling the operating characteristics of a combustion engine in which each cylinder is provided with an intake duct for the air/fuel mixture which is equipped with a member for controlling the flow rate of the said mixture and which opens into the cylinder via an inlet port, an external pressure sensor being connected to the said intake duct between the control member and the inlet port in the cylinder, the said process being defined essentially in that the pressure in the intake duct between the control member and the inlet port of each corresponding cylinder is detected in a continuous fashion with the aid of the said pressure sensors, which are independent of the components to be monitored, the said pressure is continuously converted into an analog electrical signal representative of this pressure and of its variations, this electrical signal is processed in such a way as to obtain from it the average value, and the member for controlling the flow rate is acted upon until identical characteristics are obtained for each of the cylinders.

Thus, the use of analog detection of the pressure in the feed duct of the cylinder makes it possible to have access to the precise instants at which the different operating phases of the cylinder occur, leading to the possibility of precise control of the operation of the engine cylinder by cylinder; moreover, the possibility of recording the instantaneous pressure curve of each cylinder makes it possible to detect any anomaly of operation and any structural fault of the cylinder, something which the previous processes did not allow or at least did not allow in such a reliable manner.

Likewise, according to a second aspect of the invention, a device is proposed for determining operating characteristics of at least one cylinder in a combustion engine in which each said cylinder is provided with an intake duct for the air/fuel mixture which is equipped with a member for controlling the flow rate of the said mixture and which opens into the cylinder via an inlet port, an external pressure sensor being connected to the said intake duct between the control member and the inlet port in the cylinder, the said device being defined essentially in that the pressure sensor is independent of the components to be monitored and is constructed so as to detect in continuous fashion the pressure in the intake duct between the control member and the inlet port in the cylinder.

According to a variant, a device is proposed for determining operating characteristics of at least one cylinder in a combustion engine in which each said cylinder is provided with an intake duct for the air/fuel mixture which is equipped with a member for controlling the flow rate of the said mixture and which opens into the cylinder via an inlet port, an external pressure sensor being connected to the said intake duct between the control member and the inlet port in the cylinder, the said device being defined essentially:

in that the pressure sensor is independent of the components to be monitored and is constructed so as to detect in continuous fashion the pressure in the intake duct between the control member and the inlet port in the cylinder, in that it comprises conversion means suitable for converting in continuous fashion the pressure detected into an analog electrical signal representative of this pressure and of its variations, and in that it furthermore comprises means for processing the electrical signal capable of providing information representative of at least one desired characteristic of the operation of the cylinder.

According to yet another variant, a device is proposed for controlling operating characteristics of a combustion engine in which each said cylinder is provided with an intake duct for the air/fuel mixture which is equipped with a member for controlling the flow rate of the said mixture and which opens into the cylinder via an inlet port, an external pressure sensor being connected to the said intake duct between the control member and the inlet port in each cylinder, the said device being defined essentially:

in that each pressure sensor is independent of the components to be monitored and is constructed so as to detect in continuous fashion the pressure in the intake duct between the control member and the inlet port in the corresponding cylinder, in that it comprises conversion means suitable for converting in continuous fashion the pressure detected into an analog electrical signal representative of this pressure and of its variations, and in that it furthermore comprises means for processing the electrical signal in such a way as to obtain the corresponding average values for each cylinder of the engine.

The sensor is advantageously connected to the intake duct with the aid of a flexible tube.

Again, advantageously, the pressure sensor and the conversion means are constituted by a piezoelectric sensor.

It is possible to arrange for the means for processing the electrical signal to comprise display means capable of continuously displaying the curve representative of the variations of this electrical signal such that, by comparison with a reference curve, a diagnosis on the operation of a cylinder can be deduced therefrom.

It is also possible to arrange for the means for processing the electrical signal furthermore to comprise detection means capable of detecting the peaks of the electrical signal, means for measuring the time, capable of measuring the period of time separating two successive peaks, and calculating means capable of deducing the speed of rotation of the engine therefrom; in this case it is desirable that the detection means detect the lower peaks of the electrical signal, which are present whatever the type of engine; in an advantageous embodiment, the device conceived on this basis comprises:

inversion means for inverting the electrical signal provided by the conversion means, the peak-detection means being connected to the output of the said inversion means, comparison means for comparing the signal supplied by the inversion means and the signal provided by the peak-detection means, and means for utilizing the output signal of the comparison means.

It is likewise possible to arrange for the device furthermore to comprise means for averaging the values of the analog signal delivered by the pressure sensor.

The invention will be better understood from a reading of the detailed description below of certain of its embodiments, given solely by way of non-limitative example; in this description, reference is made to the attached drawings, in which.

Figure 1:
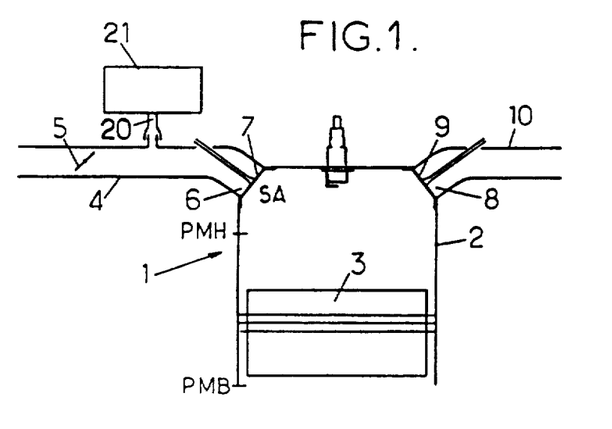
FIG. 1 is a highly schematised representation of a cylinder of a four-stroke combustion engine constructed in accordance with the invention.

Referring first of all to FIG. 1, each cylinder 1 of a four-stroke combustion engine comprises a sleeve 2 and a piston 3 to which is imparted a reciprocating motion between a top dead center position (TDC) and a bottom dead center position (BDC). A pipe 4 for the supply of the air/fuel mixture, which can be controlled with the aid of a control member or adjustable throttle 5, is connected to an inlet port 6 which can be closed by an inlet valve 7. In the same way, the burnt gases are discharged via an outlet port 8 which can be closed by an exhaust valve 9 and is connected to an exhaust duct 10.

A control device or controller 21 comprising a pressure sensor 11, for example of the piezoelectric type, is connected to the intake pipe between the control throttle 5 and the inlet valve 7 with the aid of a flexible tube 20 connected to a ready-prepared outlet provided on the intake pipe, in such a way as to detect the instantaneous pressure in this portion of the intake pipe. The pressure signal detected by the sensor is converted into an electrical output signal which reproduces the variations in the pressure to which the cell is subjected, and this electrical signal is applied to a signal processing unit 12 (an example of which will be given below) forming part of the controller and capable of providing, in a suitable form, the information deducible from the analysis of the development of this pressure in the intake pipe. A sensor of the piezoelectric type directly provides an electrical output signal representative of the variation in the pressure.

Figure 2A:
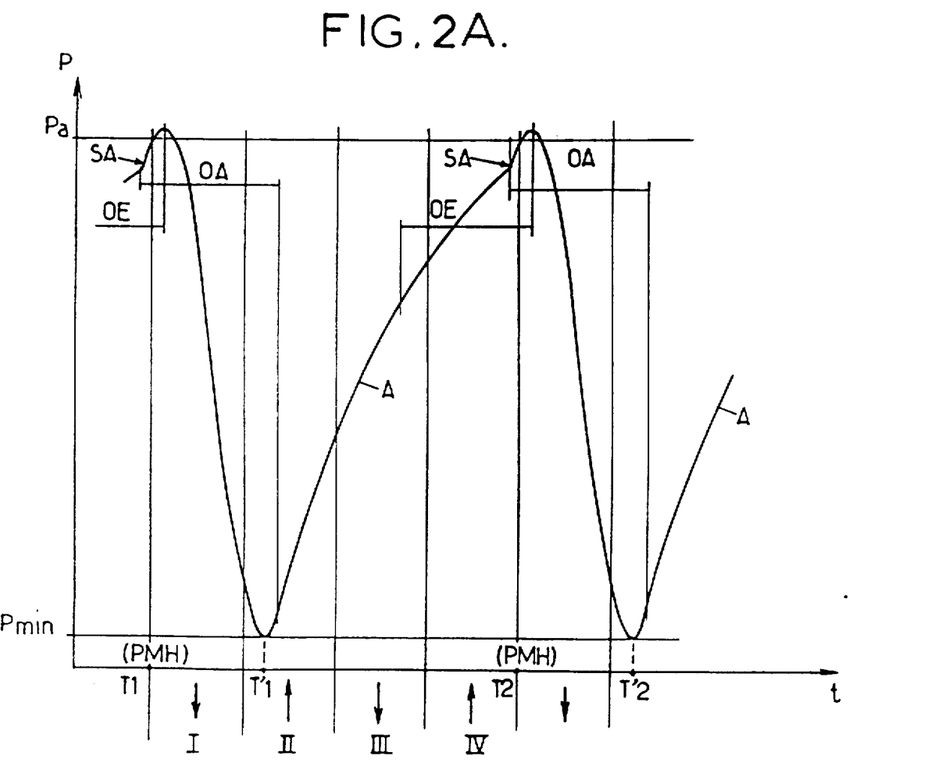
FIG. 2A is a curve, of the form which can be recorded in the context of the invention, showing the normal development of the pressure as a function of time in the intake pipe of the cylinder of a four-stroke engine shown in FIG. 1.

The variation curve of the pressure P in the intake pipe between the control throttle and the inlet valve has been represented by a solid line in FIG. 2A, as a function of time. The successive phases of an operating cycle of the cylinder have been marked on this curve by roman numerals, namely:

I = induction phase
II = compression phase
III = expansion phase
IV = exhaust phase.

The opening times of the inlet and exhaust valves have been denoted by OA and OE respectively.

At the instant $T_1$ when the piston passes through the top dead center position (TDC), the pressure in the intake pipe 4 is that of the air/fuel mixture, that is to say slightly higher than the atmospheric pressure $p_a$. With the inlet valve 7 open (expected opening : arrow SA), the piston begins its movement in the direction of the bottom dead center position at the instant T:, causing a suction. The pressure in the pipe 4 decreases to a value $P_{min}$ reached slightly before the closure of the valve 7. During the compression, expansion and exhaust phases, the pressure in the pipe 4 then increases up to the instant $T_2$ at which the piston once more passes to the top dead center position TDC.

The detection of characteristic parameters of the curve in FIG. 2A and/or the recording and analysis of this curve make it possible to determine whether the cylinder is functioning correctly or not and likewise to carry out precise control of the said cylinder.

The detection of instants $T_1$ and $T_2$ should thus make it possible to determine the operating period of the engine $(T_2-T_1)/2$. It is thus possible to construct a tachometric device based on the detection of the successive peaks of the pressure signal sampled in the inlet pipe between the control throttle and the inlet valve.

Figure 3:
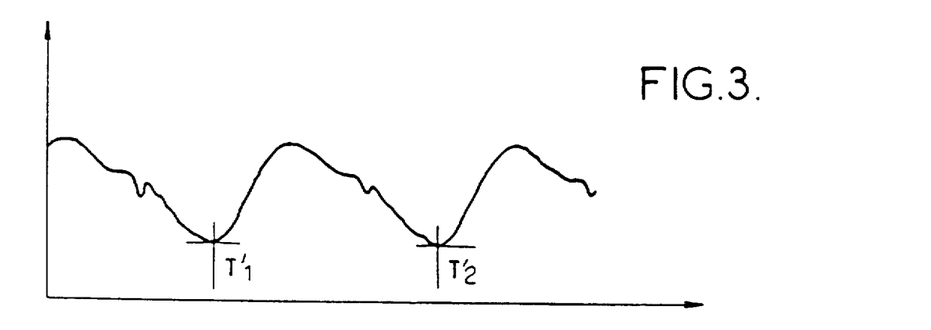
FIGS. 3 and 4 are curves similar to those in FIG. 2A and relate, respectively, to a two-stroke engine and to a rotary engine.
Figure 4:
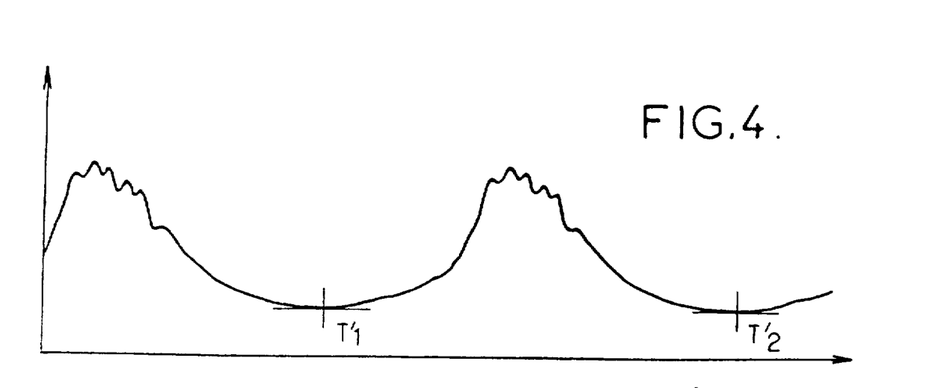

Similar arrangements with pressure sensors can be envisaged for recording the pressure in the intake pipe of each cylinder of a two-stroke engine (FIG. 3) or of a rotary engine (FIG. 4). However, the locating of the point of maximum pressure is then difficult (rotary engine or two-stroke engine) and it is desirable, if the intention is to construct a universal detection device, to detect pressure minima.

Figure 5:
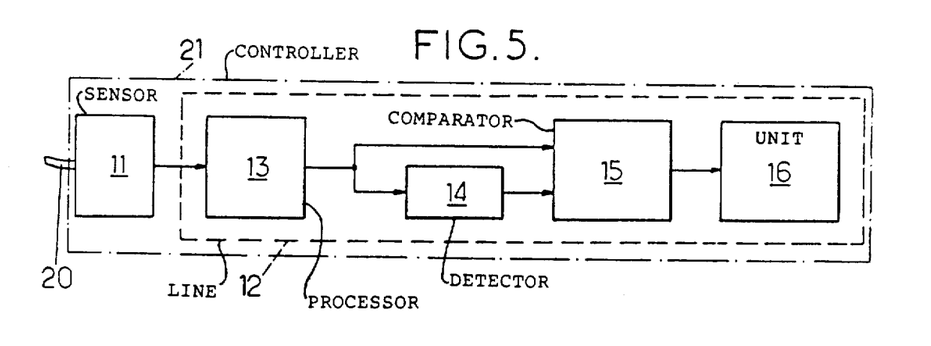
FIG. 5 is a block diagram of an example of a tachometric device making use of the process of the invention.
Figure 6:
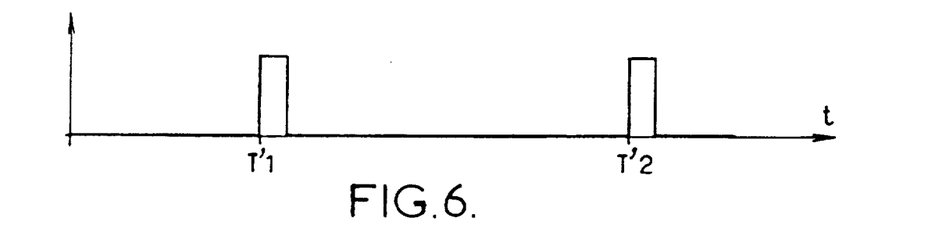
FIG. 6 represents the sequence of the pulses supplied by the device of FIG. 5, in chronological correspondence with FIG. 2A.

FIG. 5 shows schematically the construction of such a device. The electrical output signal of the sensor 11 undergoes an inversion at processor 13 such that the detection of the pressure minimum is reduced to the detection of a maximum signal. The signal thus obtained is applied, on the one hand, to a peak detection device 14 and, on the other hand, to one input of a comparator 15, the other input of which receives the output signal of the peak detection device 14. The output signal of the comparator 15 is constituted by a succession of pulses which appear at instants $T'_1, T'_2,...$ coinciding with the pressure minima of the intake pipe, as represented in FIG. 6 (the time scale in FIG. 6 corresponds to the time scale in FIG. 2A). Finally, an arithmetic unit 16 determines the successive values $(T'_2-T'_1)/2$ representing the cycle period of the cylinder, providing an exact knowledge of the instantaneous speed of rotation and/or average speed of rotation of the engine. A device constructed in this way is thus universal and is capable of carrying out tachometric measurements not only on four-stroke engines but also on two-stroke or rotary engines.

A pneumatic tachometer of this type is independent of the architecture of the engine and of its component parts and remains insensitive to electrical disturbances, in contrast to known tachometers, which traditionally operate by tapping electric variables (ignition, sensor on the engine flywheel,...).

The tachometric measurement which has just been described can be effected without actually having to record the pressure curve.

On the other hand, recording the pressure curve makes possible a diagnosis of the operation of the cylinder by comparison with a reference curve corresponding to perfect operating conditions (curve A in FIG. 2A).

Figure 2B:
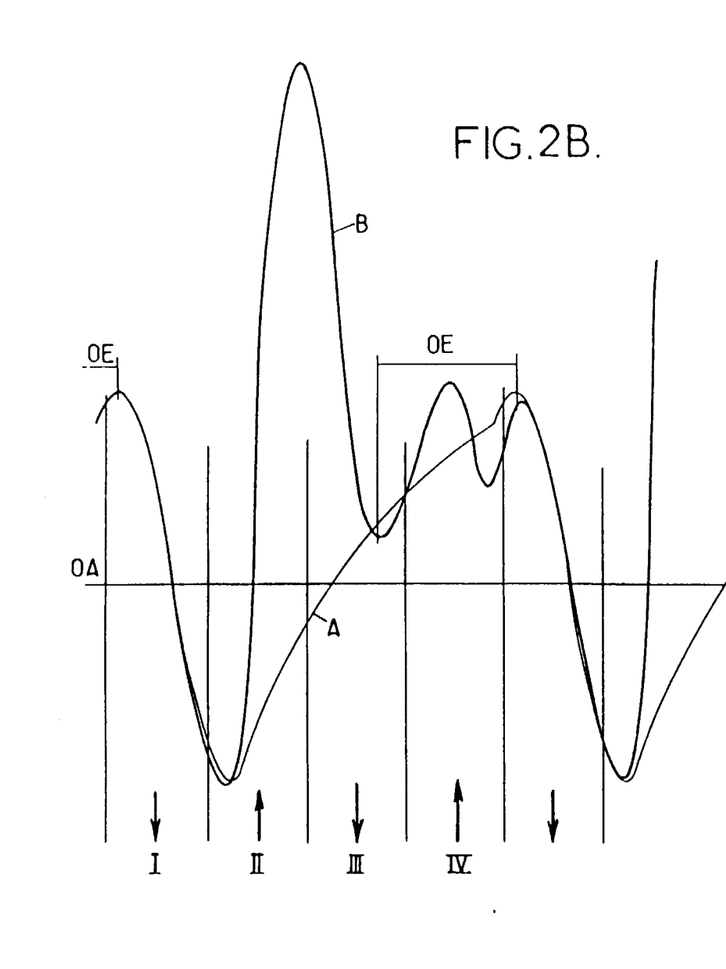
FIGS. 2B, 2C and 2D are curves showing the abnormal development of the pressure as a function of time in the case of a defective inlet valve, of a defective exhaust valve and of the existence of an air inlet on the intake manifold, respectively.

By way of example, where there is a leak at the inlet valve (deformation of the valve head, worn seat,...), the elevated pressure prevailing in the cylinder in the course of the compression phase is transmitted at least in part by the leak and the rise in pressure in the intake pipe, starting from the value $P_{min}$ is very rapid (curve B in FIG. 2B).

Figure 2C:
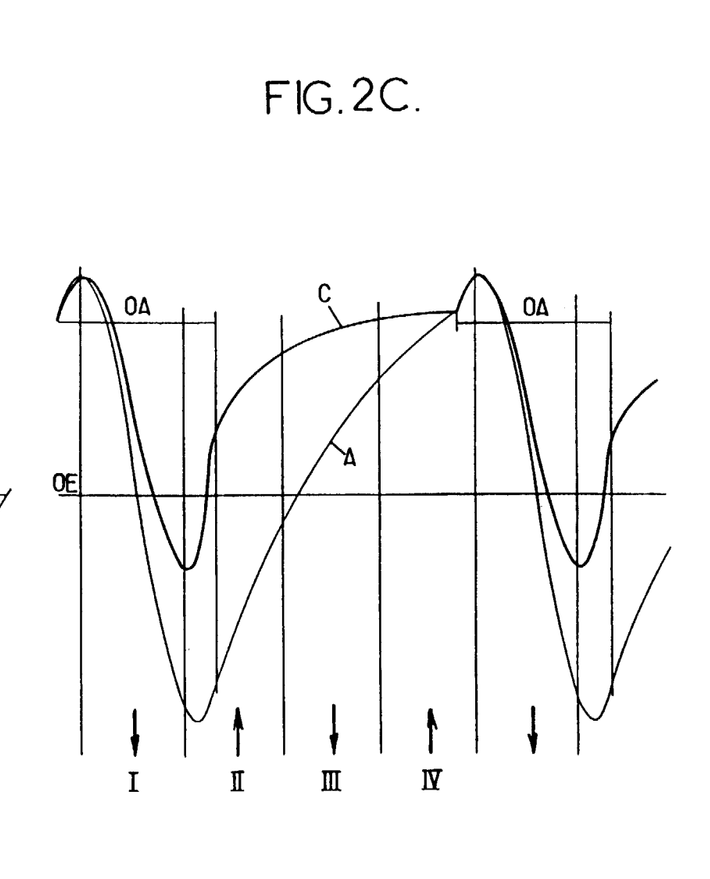

In the same way, a leak at the exhaust valve (deformation of the valve head, worn seat,...) is detectable by the fact that the minimum value of the pressure detected by the sensor remains higher than the value $P_{min}$ obtained in normal operation (curve C in FIG. 2C).

Figure 2D:
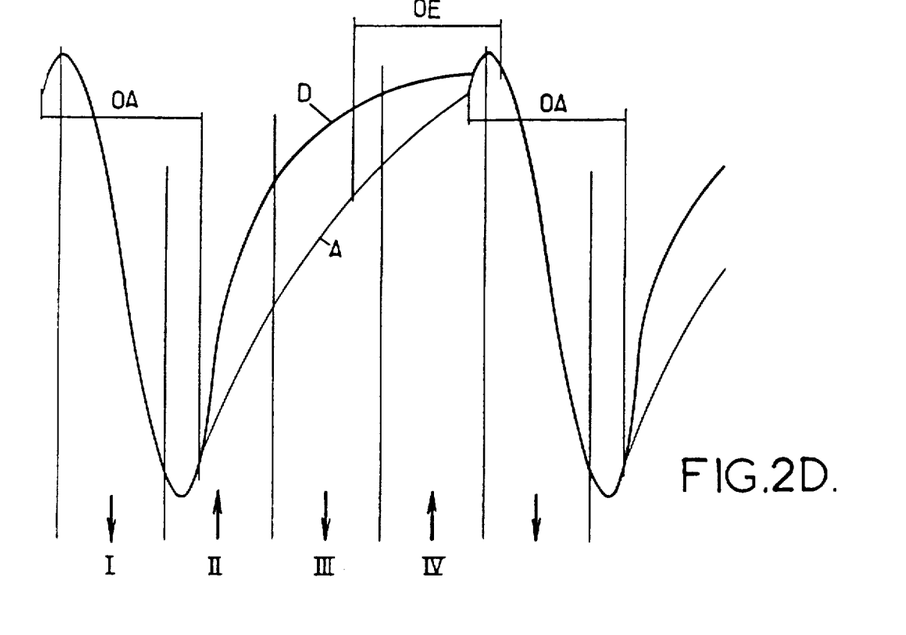

In the same way, the presence of a parasitic air inlet in the intake pipe is detectable by the fact that the rise in pressure in the intake pipe, starting from the value $P_{min}$, up to the value of the ambient atmospheric pressure Pa, is much more rapid (curve D in FIG. 2D).

In the specific case of a four-stroke engine, the recording of the curve of FIG. 2A makes it possible to determine the "inflection" points (marked by SA on FIG. 2A) corresponding to the opening instants of the inlet valve 6; the knowledge of the distribution diagram then allows the positioning of the characteristic points of the power cycle.

The device represented in FIG. 5 is a single-channel device, i.e. comprising only a single pressure take-off (tube 20), a single pressure sensor 11 and a single measurement line 12; it is therefore incapable of carrying out measurements and controls on more than one cylinder at a time. The control of the operation of a multi-cylinder engine thus necessitates the addition of means for storing the information recorded independently for the individual cylinders in order to make possible comparative adjustments (compensations for example).

Figure 7:
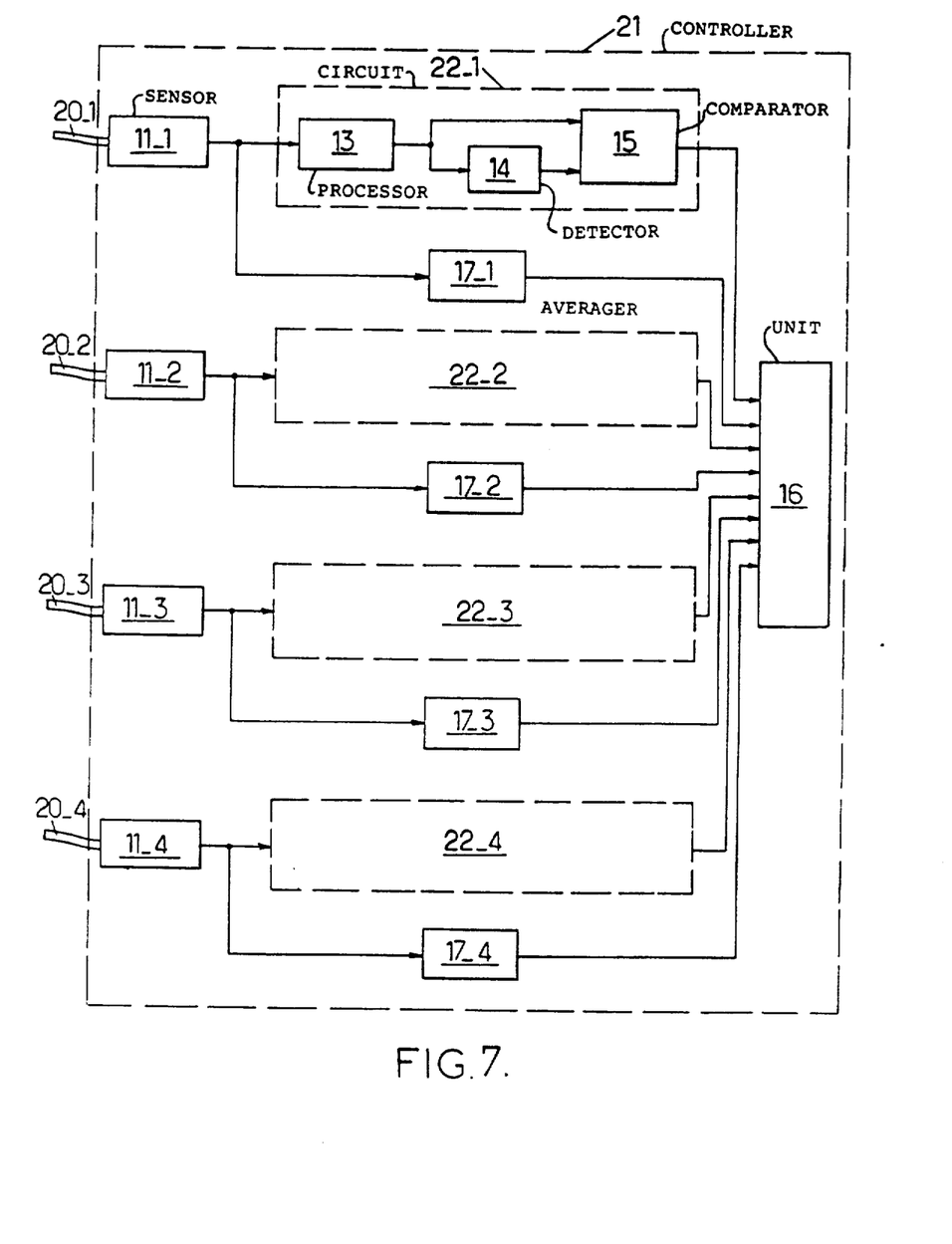
FIG. 7 is a block diagram showing the tachometric device incorporating a control function for the cylinders of an engine.

A more advantageous solution, permitting simultaneous acquisition of information from all the cylinders (for example four) of an engine, consists in using the device in FIG. 7 which groups together a plurality of measurement lines (four in this case) each assigned to one cylinder of the engine. As above, each pressure sensor 11-1 to 11-4 is connected to a respective circuit 22-1 to 22-4 for the processing of the electrical signal. Moreover, in parallel to circuits 22-1 to 22-4, a circuit 17-1 to 17-4 for processing the electrical output signal of the sensor 11-1 to 11-4 is provided in order to supply the average value of the said signal.

The respective outputs of circuits 22-1 to 22-4 and 17-1 to 17-4 are connected to a common unit 16 for managing and utilizing the information obtained, advantageously in the form of a microprocessor. By virtue of this, it is possible instantaneously to compare the operation of the cylinders and to carry out an adjustment of the engine, for example by acting on the respective members 5 for controlling the flow rate until identical characteristics are obtained for each of the cylinders.

The arrangements according to the invention thus make it possible, starting from pressure information sampled from the intake manifold of a cylinder, to obtain exact and precise operating characteristics of the cylinder and, above and beyond that, operating characteristics of an engine, something which previous devices did not permit. Moreover, all the components of the control device, including the pressure sensor or sensors, are gathered together in a single box also containing all the associated electronics, and only the connection member or members, in the form of a simple flexible tube, are taken to the cylinder and/or to the engine. This results in a simplification of implementation and, above all, the risks of poor mounting which were encountered in the previous devices, in which the sensor was situated outside the box and had to be installed on the engine, for example against the intake pipe, by means of suitable pliers, are eliminated; the errors introduced by the exertion of incorrect forces for applying the sensors to the pipe, the necessity of numerous and delicate adjustments and the risks of damage run by sensors not protected in a box are simultaneously eliminated.

As is self-evident and as moreover follows already from what has been stated above, the invention is in no way limited to those of its modes of application and embodiment which have been considered in greater detail; on the contrary, it includes all its variants.

What is claimed is:

1. A process for determining operating characteristics of one of a plurality of cylinders of a combustion engine, each cylinder including (a) an intake duct, an air/fuel mixture (b) a member in the intake duct for controlling the flow rate of the mixture through the intake duct for and (c) an inlet port which opens into the cylinder, comprising the steps of:

fluidly connecting an external pressure sensor located remotely from the engine to the respective intake duct between the respective control member and the respective inlet port of the one cylinder,     detecting the pressure in the respective intake duct between the respective control member and the respective inlet port of the one cylinder in a continuous fashion with the pressure sensor,     converting the detected pressure continuously into an analog electrical signal representative of this pressure and of its variations,     detecting instants at which peaks of the electrical signal occur,     measuring the period of time separating two successive peaks, and     deducing a speed of rotation of the engine from the measured period of time.

2. A process for determining operating characteristics as claimed in claim 1 wherein the instants detecting step detects lower peaks of the electrical signal.

3. A process for determining operating characteristics as claimed in claim 1 wherein the engine is a four-stroke combustion engine, and wherein said instants detecting step detects instants at which there is an amplitude maxima of the electrical signal, the maxima corresponding to a passing of top dead center position of a piston associated with the one cylinder.

4. A process for determining operating characteristics of a combustion engine in which each of a plurality of cylinders thereof is provided with (a) an intake duct for an air/fuel mixture (b) a member in the intake duct for controlling the flow rate of the mixture through the intake duct, and (c) an inlet port which opens into the cylinder, comprising the steps of:

fluidly connecting a respective external pressure sensor located remotely from the engine to the intake duct between the control member and the inlet port of each cylinder,     detecting the pressure in the respective intake duct between the respective control member and the respective inlet port of each corresponding cylinder in a continuous fashion with the pressure sensors,     converting the respective detected pressures continuously into respective analog electrical signals representative of the associated pressures and of their variations,     detecting instants at which peaks of the electrical signals occur,     measuring the period of time separating two successive peaks, and     deducing a speed of rotation of the engine from the measured period of time.

5. A process for determining operating characteristics as claimed in claim 4 wherein the instants detecting step detects lower peaks of the electrical signals.

6. A process for determining operating characteristics as claimed in claim 4 wherein the engine is a four-stroke combustion engine, and wherein said instants detecting step detects instants at which there is an amplitude maxima of the electrical signals, the maxima corresponding to a passing of top dead center position of a respective piston associated with the respective cylinder.

7. A process for determining operating characteristics as claimed in claim 4 and further including the steps of:

acting upon a respective member for controlling a richness of each associated cylinder until an ideal air/gasoline ratio for the operation of the engine corresponding to a maximum speed of the engine is obtained.

8. A process for controlling the operating characteristics of a combustion engine in which each of a plurality of cylinders thereof is provided with (a) an intake duct for an air/fuel mixture, (b) a member in the intake duct for controlling the flow rate of the mixture through the intake duct, and (c) an inlet port which opens into the cylinder comprising the steps of:

fluidly connecting a respective external pressure sensor located remotely from the engine to the respective intake duct between the control member and the inlet port of each cylinder,     detecting the pressure in the respective intake duct between the control member and the inlet port of each corresponding cylinder in a continuous fashion with the pressure sensors,     converting the pressure of each cylinder continuously into an analog electrical signal representative of this pressure and of its variations,     processing this electrical signal of each cylinder to obtain an average value of the signals, and     acting upon the member for controlling the flow rate until identical characteristics are obtained for each of the cylinders.

9. A device for determining operating characteristics of at least one of a plurality of cylinders in a combustion engine in which each said cylinder is provided with an intake duct for an air/fuel mixture for the associated cylinder, a member in said intake duct for controlling the flow rate of the mixture through the intake duct to the associated cylinder, and an inlet port which opens into the associated cylinder, comprising:

an external pressure sensor fluidly connected to the respective intake duct between the respective control member and the respective inlet port of the one cylinder, wherein said pressure sensor detects in a continuous fashion the pressure in the intake duct between the control member and the inlet port of the one cylinder,     a conversion means for converting in a continuous fashion the pressure detected by said pressure sensor into an analog electrical signal representative of this pressure and of its variations,     a detection means for detecting peaks of the electrical signal,     a measuring means for measuring a period of time separating two successive peaks, and     a calculating means for deducing a speed of rotation of the engine from the measure time period.

10. A device for determining operating characteristics as claimed in claim 9 and further including a flexible tube means for connecting said pressure sensor to the associated said intake duct of the one cylinder.

11. A device for determining operating characteristics as claimed in claim 9 wherein said pressure sensor is a piezoelectric sensor.

12. A device for determining operating characteristics as claimed in claim 9 wherein said detection means detects lower peaks of the electrical signal.

13. A device for determining operating characteristics of at least one of a plurality of cylinders in a combustion engine in which each said cylinder is provided with an intake duct for an air/fuel mixture for the associated cylinder, a member in said intake duct for controlling the flow rate of the mixture through the intake duct to the associated cylinder, and an inlet port which opens into the associated cylinder, comprising:

an external pressure sensor fluidly connected to the respective intake duct between the respective control member and the respective inlet port of the one cylinder, wherein said pressure sensor detects in a continuous fashion the pressure in the intake duct between the control member and the inlet port of the one cylinder,     a conversion means for converting in a continuous fashion the pressure detected by said pressure sensor into an analog electrical signal representative of this pressure and of its variations,     an inversion means for inverting the electrical signal provided by the conversion means,     a peak-detection means connected to an output of said inversion means for detecting peaks in the inverted electrical signal,     a comparison means for comparing a signal supplied by the inversion means and a signal provided by the peak-detection means, and     a means for utilizing an output signal of the comparison means.

14. A device for determining operating characteristics as claimed in claim 13 and further including a flexible tube means for connecting said pressure sensor to the associated said intake duct of the one cylinder.

15. A device for determining operating characteristics as claimed in claim 13 wherein said pressure sensor is a piezoelectric sensor.

16. A device for controlling operating characteristics of a combustion engine having a plurality of cylinders in which each said cylinder is provided with an intake duct for an air/fuel mixture for the associated cylinder, a member in said intake duct for controlling the flow rate of the mixture through the intake duct to the associated cylinder, and an inlet port which opens into the associated cylinder, comprising:
- a respective external pressure sensor fluidly connected to said intake duct between the control member and the inlet port of each associated cylinder, wherein each said pressure sensor detects in a continuous fashion the pressure in the respective intake duct between the control member and the inlet port of the associated cylinder,
- a respective conversion means for converting in continuous fashion the pressure detected in each associated cylinder into an analog electrical signal representative of this pressure and of its variations,
- a detection means for detecting peaks of the associated electrical signal,
- a measuring means for measuring a period of time separating two successive peaks, and
- a calculating means for deducing a speed of rotation of the engine from the measured time period.

17. A device for controlling operating characteristics as claimed in claim 16 wherein each said detection means detects lower peaks of the associated electrical signal.

18. A device for controlling operating characteristics as claimed in claim 16 and further including a respective flexible tube means for connecting each said pressure sensor to the associated said intake duct of the associated cylinder.

19. A device for controlling operating characteristics as claimed in claim 16 wherein each said pressure sensor is a piezoelectric sensor.

20. A device for controlling operating characteristics of a combustion engine having a plurality of cylinders in which each said cylinder is provided with an intake duct for an air/fuel mixture for the associated cylinder, a member in said intake duct for controlling the flow rate of the mixture through the intake duct to the associated cylinder, and an inlet port which opens into the associated cylinder, comprising:
- a respective external pressure sensor fluidly connected to said intake duct between the control member and the inlet port of each associated cylinder, wherein each said pressure sensor detects in a continuous fashion the pressure in the respective intake duct between the control member and the inlet port of the associated cylinder,
- a respective conversion means for converting in continuous fashion the pressure detected in each associated cylinder into an analog electrical signal representative of this pressure and of its variations,
- an inversion means for inverting the electrical signal provided by the associated conversion means,
- a peak-detection means connected to an output of the associated said inversion means for detecting peaks in the associated inverted electrical signal,
- a comparison means for comparing an associated signal supplied by the associated inversion means and an associated signal provided by the associated peak-detection means, and
- a means for utilizing an output signal of the comparison means.

21. A device for controlling operating characteristics as claimed in claim 20 and further including a respective flexible tube means for connecting each said pressure sensor to the associated said intake duct of the associated cylinder.

22. A device for controlling operating characteristics as claimed in claim 20 wherein each said pressure sensor is a piezoelectric sensor.

* * * * *